United States Patent
Senra et al.

(10) Patent No.: US 10,901,973 B1
(45) Date of Patent: Jan. 26, 2021

(54) METHODS AND APPARATUS FOR A SEMANTIC MULTI-DATABASE DATA LAKE

(71) Applicant: EMC IP Holding Company LLC, Hopkinton, MA (US)

(72) Inventors: Rodrigo Dias Arruda Senra, Rio de Janeiro (BR); Karin Breitman, Rio de Janeiro (BR); Adriana Bechara Prado, Rio de Janeiro (BR); Victor Bursztyn, Rio de Janeiro (BR)

(73) Assignee: EMC IP Holding Company LLC, Hopkinton, MA (US)

(*) Notice: Subject to any disclaimer, the term of this patent is extended or adjusted under 35 U.S.C. 154(b) by 563 days.

(21) Appl. No.: 15/142,445

(22) Filed: Apr. 29, 2016

(51) Int. Cl.
*G06F 16/23* (2019.01)
*G06F 16/25* (2019.01)
*G06F 16/2455* (2019.01)

(52) U.S. Cl.
CPC .......... *G06F 16/23* (2019.01); *G06F 16/2455* (2019.01); *G06F 16/258* (2019.01)

(58) Field of Classification Search
CPC ................................................ G06F 17/30345
See application file for complete search history.

(56) References Cited

U.S. PATENT DOCUMENTS

| | | | | |
|---|---|---|---|---|
| 9,703,814 B1* | 7/2017 | Shams | .................. | G06F 16/273 |
| 9,886,483 B1* | 2/2018 | Harrison | ................. | G06F 16/28 |
| 2004/0243595 A1* | 12/2004 | Cui | .......................... | G06F 16/25 |
| 2005/0125430 A1* | 6/2005 | Souder | ..................... | G06F 16/27 |
| 2008/0010253 A1* | 1/2008 | Sidhu | ................ | G06F 17/30867 |
| 2008/0133552 A1* | 6/2008 | Leary | ................ | G06F 17/30539 |
| 2014/0156638 A1* | 6/2014 | Joshi | ................ | G06F 17/30566 |
| | | | | 707/722 |
| 2016/0210328 A1* | 7/2016 | Bendel | ............. | G06F 17/30466 |

OTHER PUBLICATIONS

Stonebraker et al., "One size fits all: an idea whose time has come and gone," Data Engineering, ICDE 2005, Proceedings 21st International Conference on IEEE, 2005.

(Continued)

*Primary Examiner* — Mark D Featherstone
*Assistant Examiner* — Tony Wu
(74) *Attorney, Agent, or Firm* — Ryan, Mason & Lewis, LLP

(57) ABSTRACT

Methods and apparatus are provided for integrating a plurality of different database types in a semantic multi-database data lake. An exemplary method comprises providing a plurality of databases having different database types; translating ontology definition language database commands obtained from a user into a plurality of data definition language and/or data manipulation language commands supported by the different database types in order to replicate data from the user to each of the different database types; obtaining a query specified in a query language of a given database; and delegating the query to the given database. A plurality of cluster gateways optionally manage a corresponding plurality of clusters of database instances and wherein queries are delegated to a given database instance by delegating the queries to the appropriate cluster gateway. Dark data that was not queried by any supported query language in a predefined period of time can be detected.

20 Claims, 11 Drawing Sheets

(56) References Cited

OTHER PUBLICATIONS

Duggan et al., "The BigDAWG Polystore System", ACM SIGMOD Record 44.2, pp. 11-16 (2015).
Codd, Edgar R., "A relational model of data for large shared data banks", Communications of the ACM 13.6, pp. 377-387 (1970).
Taylor et al., "CODASYL data-base management systems", ACM Computing Surveys (CSUR) 8.1, pp. 67-103 (1976).
Wache, et al., "Ontology-based integration of information—a survey existing approaches", IJCAI-01 workshop: ontologies and information sharing., vol. 2001 (2001).
Klyne et al., "Resource description framework (RDF): Concepts and abstract syntax", (2006).

* cited by examiner 328-2

QUERYING 330-1

GET http://localhost/db/document/mdb001
Content-type: application/json
　　db.Call.find({ calling_party : "55 21 99123 9876" })

QUERYING 340-1

GET http://localhost/db/relational/pgis001
Content-type: application/sql
SELECT *
FROM Call INNER JOIN CellularAntenna ON (Call.in_antenna = CellularAntenna.antenna_id),
WHERE ST_DWithin(ST_MakePoint(-43.182365, -22.970722),
　　　　　ST_MakePoint(CellularAntenna.long, CellularAntenna.lat),
　　　　　10000 )
　　AND　　Call.start_time >= to_timestamp('2015-01-01 00:00:01', 'YYYY-MM-dd HH:MM:SS')
　　AND　　Call.start_time <= to_timestamp('2015-01-01 23:59:59', 'YYYY-MM-dd HH:MM:SS')

QUERYING 350-1

GET http://localhost/db/graph/n4j001
Content-type: text/cypher
MATCH (pl1:PhoneLine { phonenumber : "55 21 99123 9876" })-[*1..2]->(pl2:PhoneLine)
RETURN pl1,pl2

US 10,901,973 B1

METHODS AND APPARATUS FOR A SEMANTIC MULTI-DATABASE DATA LAKE

FIELD

The invention relates generally to data integration techniques and, more particularly, to techniques for integrating heterogeneous data in a unified data repository.

BACKGROUND

Software developers and data analysts routinely deal with different types of structured and unstructured heterogeneous data, such as telemetry, sensor data, video, audio and text. Most data sources are stored separately and in a non-integrated fashion, which is often referred to as the data silo problem.

A data lake is a large data repository for storing "big data." A data lake is designed to retain all data attributes, especially when the use of the data is unknown. The data lake typically stores raw data in one or more native formats using a flat structure, where schema and the relevant data attributes are only defined when the data is queried by an application.

A need exists for improved techniques for integrating such heterogeneous data in a unified data repository.

SUMMARY

Illustrative embodiments of the present invention provide methods and apparatus for integrating a plurality of different database types in a semantic multi-database data lake. In one exemplary embodiment, a method comprises the steps of providing a plurality of databases having different database types; obtaining one or more ontology definition language database commands from a user; translating the obtained ontology definition language database commands into a plurality of one or more of a data definition language and a data manipulation language supported by the different database types in order to replicate data obtained from the user to each of the different database types; obtaining one or more queries specified in a query language of a given database; and delegating the one or more queries to the given database.

In one or more embodiments, a given database of a given database type comprises a cluster of one or more database instances of the database type. A plurality of cluster gateways optionally manage a corresponding plurality of the clusters of the database instances of the database type and wherein queries are delegated to a given database by delegating the queries to the appropriate cluster gateway of the given database.

In at least one embodiment, the ontology definition language database commands are implemented using the Resource Description Framework (RDF). The ontology definition language database commands comprise, for example, insertion, update and/or removal commands.

One or more embodiments detect data in the semantic multi-database data lake that was not queried by any supported query language, often referred to as dark data.

As noted above, illustrative embodiments described herein provide significant improvements relative to conventional storage systems by integrating a plurality of different database types in a semantic multi-database data lake. These and other features and advantages of the present invention will become more readily apparent from the accompanying drawings and the following detailed description.

BRIEF DESCRIPTION OF THE DRAWINGS

FIGS. 11A through 11C illustrate several examples of queries, each issued for a different encapsulated database type;

DETAILED DESCRIPTION

Illustrative embodiments of the present invention will be described herein with reference to exemplary communication, storage, and processing devices. It is to be appreciated, however, that the invention is not restricted to use with the particular illustrative configurations shown. Aspects of the present invention provide methods and apparatus for integrating a plurality of different database types in a semantic multi-database data lake.

In one or more embodiments, a unified, single central data repository (e.g., a data lake) is provided that allows for different modes of perceiving data (e.g., looking at and manipulating data from different points of view, such as a text, object, relational or graph perspective). Datasets are typically very complex, as well as very rich content-wise. One or more aspects of the invention recognize that datasets should be used for information retrieval based on intentions of those querying the data lake. In this manner, a user can select an expressive and efficient query language for retrieving data for a specific use (intent). Software developers and data analysts can manage data of substantially any shape and do many types of processing and analytics.

Figure 2:
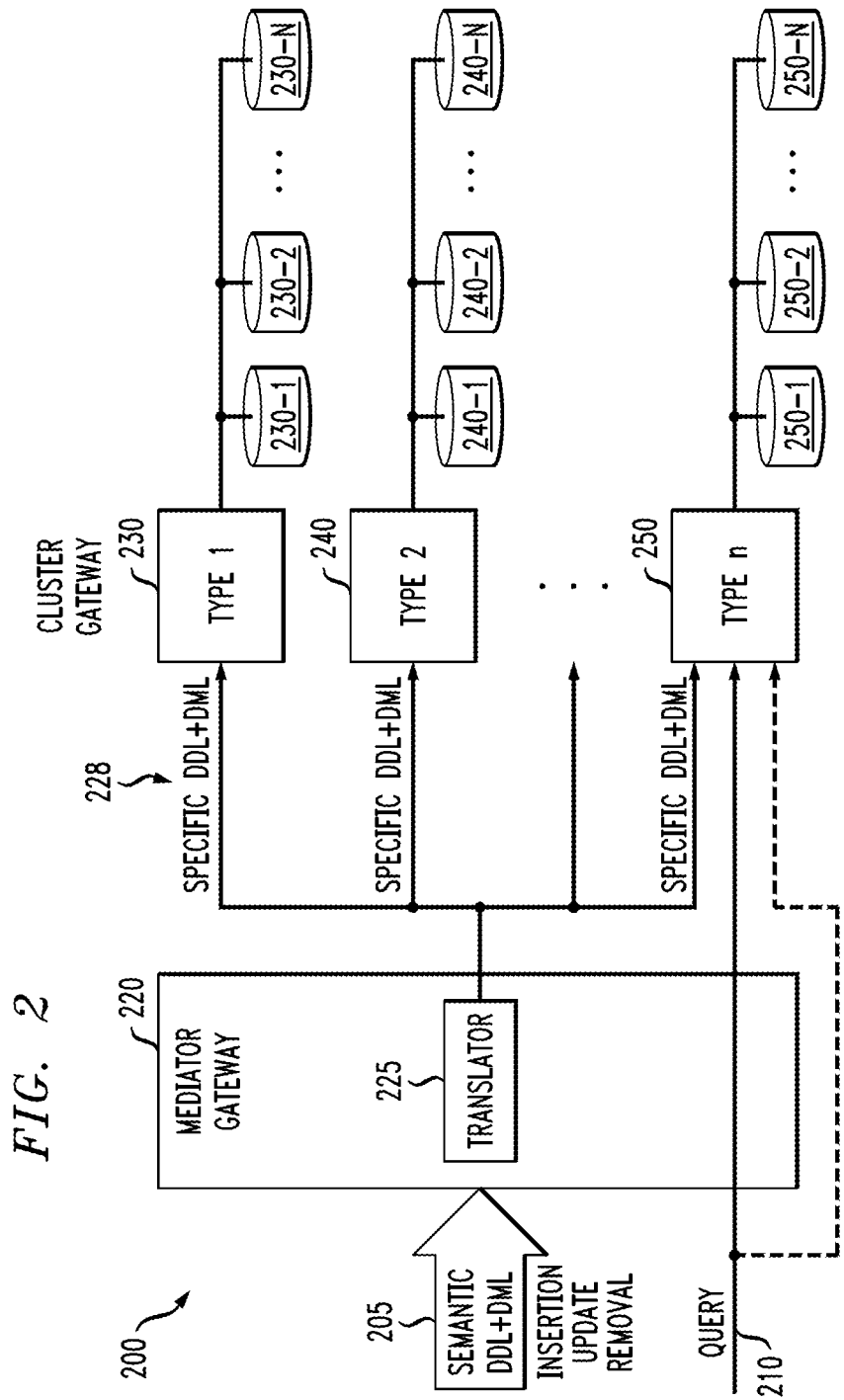

While one or more embodiments of the invention are illustrated herein using different database types comprising one or more of relational databases, text databases, object-oriented databases, document-oriented databases, key-value databases, knowledge bases, real-time databases, XML databases, spatial databases, time series databases, temporal databases and graph databases, the present invention may be employed with any database type where a mapping can be created between the operations of the inner database (whatever the database type) and RDF (or another ontology description language), to allow such database to be embedded in the semantic multi-database data lake 200, discussed further below in conjunction with FIG. 2.

Figure 1:
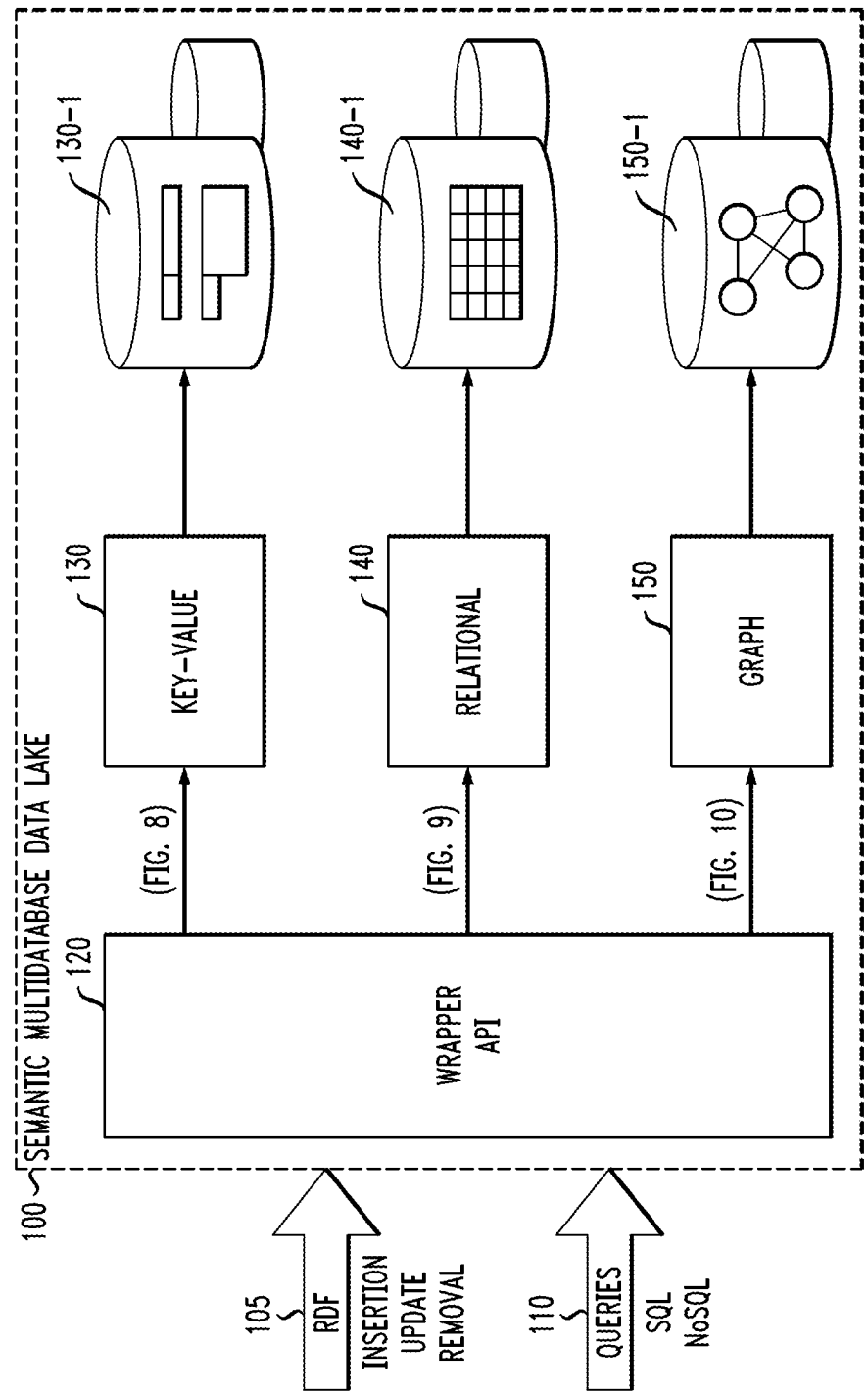
FIGS. 1 and 2 illustrate an exemplary semantic multi-database data lake architecture, in accordance with one or more embodiments of the invention.

FIG. 1 illustrates an exemplary semantic multi-database data lake architecture 100 in accordance with one or more embodiments of the invention. Generally, the exemplary semantic multi-database data lake architecture 100 comprises a plurality of databases of different database types 130, 140, 150 that are wrapped by a wrapper application programming interface (API) 120 to appear to a user as a single database that uses one common database language.

A given database 130-1, 140-1, 150-1 of a given database type 130, 140, 150 comprises, for example, a cluster of one or more database instances of the database type. All databases in a given cluster are of the same database type (e.g., relational, text, object-oriented, document-oriented, key-value, or graph database type), which defines how to structure, index and query data.

The common database language may be implemented as an ontology definition language, such as the Resource Description Framework (RDF). See, e.g., Graham Klyne and Jeremy J. Carroll, "Resource Description Framework (RDF): Concepts and Abstract Syntax," W3C Recommendation (2004), incorporated by reference herein in its entirety. Typically, an ontology description language expresses knowledge as a triple (subject, predicate and object).

RDF is used to build semantic versions of a data definition language (DDL) and a data manipulation language (DML). The semantic-based DDL and DML languages commands 105 obtained from a user are automatically translated by the wrapper API 120 into the specific data definition languages (DDL) and/or data manipulation languages (DML) supported by each of the different database types 130, 140, 150 in order to replicate data obtained from the user to each of the different database types 130, 140, 150. In one or more embodiments, data consistency is provided across the encapsulated databases, such as referential integrity and other functional dependencies.

In this manner, the wrapper API 120 provides a single interface to all of the supported database types 130, 140, 150, and uses the ontology description language to perform insertion, update and removal operations of data. In addition, as discussed further below, the exemplary wrapper API 120 multiplexes the different query languages 110 supported by the underlying database clusters in order to use the specialized query languages 110 of the encapsulated databases 130, 140, 150 for general queries. For a more detailed discussion of aspects of the exemplary wrapper API 120, see, for example, Erich Gamma et al., 37 Design Patterns: Elements of Reusable Object-Oriented Software (Pearson Education; 1994), incorporated by reference herein in its entirety.

In one exemplary implementation, a data schema is defined only once using RDF. Afterwards, the RDF schema is translated into three other exemplary supported data models, one for each encapsulated database (such as the key-value, relational, and graph database types 130, 140, 150 shown in FIG. 1). In at least one embodiment of the exemplary semantic multi-database data lake architecture 100, data is inserted once, and data is retrieved using the specific query languages 110 supported by the encapsulated databases 130, 140, 150.

Terminology

A relational database typically offers relations, tuples, and keys as the structuring mechanism, and SQL as the mechanism for DDL and DML.

A text database typically structures data as full text documents and provides a specialized search engine that decomposes text from documents into words, trying to match search criteria (user-specified textual pattern) to documents within the database.

An object-oriented database typically stores data in the form of objects or hierarchical records of fields and values. The object-oriented database serves to persist structured information or in-memory data structures from programming languages, while preserving the data hierarchical relationships.

A key-value database typically treats the data as a single opaque collection, where records may have different attributes.

A document-oriented database is normally considered a kind of key-value database, where the value is a document that consists of a user readable non-opaque data.

A graph database typically uses graph structures such as nodes, edges and properties to represent and store data. Graph databases do not require expensive join operations and depend less on a rigid schema, being more suitable to ad hoc evolving schemas. Graph databases are powerful tools for queries regarding shortest paths between nodes and the detection of clusters.

A data definition language (DDL) is any formal language for describing data or information structures. A data manipulation language (DML) is a language used for inserting, deleting and updating data in a database. Performing read-only queries of data is sometimes also considered a component of DML.

A federated database or multi-database system is a type of meta-database management system which transparently maps multiple autonomous databases into a single virtual database. Usually, there is no actual data integration in the constituent disparate databases. The federated database decomposes a query into subqueries which are submitted to each constituent database. The results of the subqueries are integrated into a single and coherent response.

Dark data is known as the information that organizations collect, process and store during regular business activities, but generally fail to realize its potential for generating business value (e.g., analytics, direct monetizing).

Representational State Transfer (REST) is an architecture style for designing networked applications that relies on a stateless client-server, typically built upon the HTTP protocol. RESTful APIs expose resources identified by means of a Uniform Resource Identifier (URI), which can be operated upon using standard HTTP verbs, such as GET, PUT, POST, DELETE, HEAD and OPTIONS.

The Resource Description Framework (RDF) is a family of World Wide Web Consortium (W3C) specifications for building data models. As noted above, RDF typically represents information using triples consisting of the pattern <subject> <predicate> <object>. RDF allows for structured and semi-structured data to be mixed, exposed, and shared across different applications. This structure forms a directed, labeled graph, where the edges represent the named relationship between two resources, which are represented by the graph nodes. There are many languages to represent RDF, such as RDF/XML, N3, N-Triples and Turtle (Terse RDF Triple Language). One or more exemplary embodiments of the invention employ Turtle to describe the examples herein. Turtle is a subset of N3 and a superset of N-Triples, which provides a way to group three URIs to make a triple and provides ways to abbreviate such triples.

Michael Stonebraker and Ugur cetintemel, "One Size Fits All: An Idea Whose Time Has Come and Gone," Proc. Of 21st Int'l Conf. on Data Engineering (IEEE 2005) foresaw that the database commercial world would fracture into a collection of independent database engines. The reason is that different demands upon a single body of information might benefit from different approaches of data structuring. For example, in the normalized relational model it is not easy to handle hierarchies. Therefore, to explore subjacent hierarchical or any network-like relationships a graph model may be more suitable. On the other hand, to speed-up the retrieval of nested records a key-value may be the best choice.

Some enterprises keep their data spread across independent and heterogeneous databases having different levels of isolation between them. This non-federated database approach could potentially lead to the following problems:

1. high costs for the development and maintenance of complex middleware to tackle the former problems, such as: integration gateways, consistency checkers and data cleaners;

2. data inconsistency across different databases after asymmetric insert-update-delete operations;

3. high costs for training personnel to operate many databases with different DDLs;

4. low latency and high costs due to schema mapping and data movements between databases, for instance, when a data subset has to be migrated into a different database which offers a particular query model that is not provided by the database where such subset was initially stored.

Another problem is the identification of dark data in an enterprise data lake. The dark data problem arises because organizations tend to collect and store information for compliance purposes or because it is cheaper to simply store everything. Alternatively, they could "skim-and-scan" data before ingestion in order to properly identify what subsets are relevant and apply the proper cleaning and filtering.

Semantic Multi-Database Data Lake

As noted above, one or more embodiments of the invention provide a data lake architecture where the same data is stored in a plurality of database types by means of different representations, such as relations, graphs, and documents, preserving query expressivity, reducing data management operations, and ensuring data consistency.

FIG. 2 illustrates an exemplary semantic multi-database data lake architecture 200 in accordance with one or more embodiments of the invention. The exemplary semantic multi-database data lake architecture 200 comprises a plurality of databases of different database types 230, 240, 250, in a similar manner to FIG. 1.

A given database of a given database type comprises, for example, a cluster 230, 240, 250 of one or more database instances 230-1 through 230-N, 240-1 through 240-N, 250-1 through 250-N of the database type. All databases in a given cluster 230, 240, 250 are of the same database type (e.g., relational, text, object-oriented, document-oriented, key-value, or graph database type), which defines how to structure, index and query data.

The exemplary semantic multi-database data lake architecture 200 comprises a cluster gateway to manage each of the clusters 230, 240, 250 of database instances 230-1 through 230-N, 240-1 through 240-N, 250-1 through 250-N of the same database type to provide horizontal scalability (and/or redundancy).

In the embodiment of FIG. 2, RDF is used to build semantic versions of a data definition language (DDL) and a data manipulation language (DML). Thus, the cognitive overhead is reduced and training, development, and maintenance are simplified.

The semantic-based DDL and DML commands 205 obtained from a user (e.g., for insertion, update and removal of data) are automatically translated by a translator 225 of a mediator gateway 220 into the specific DDL and/or DML commands 228 supported by each of the different database clusters 230, 240, 250, as discussed further below in conjunction with FIGS. 8-10, in order to replicate data obtained from the user to each of the different database types.

Thus, the mediator gateway 220 provides a single interface to all of the supported database types, in a similar manner as the wrapper API 120 of FIG. 1, and uses the ontology description language (e.g., RDF) to perform insertion, update and removal operations of data.

In at least one embodiment, the mediator gateway 220 is implemented as a RESTful API comprising a main interface for DDL and DML. In this manner, RESTful microservices can be used to build the data lake APIs. Thus, open standards and tools can be leveraged, as well as providing loose coupling with programming languages, and adherence to both W3C Linked Data and Semantic Web initiatives.

Database operations 205 can be expressed in RDF using a domain specific ontology. It is the task of the mediator gateway 220 to translate operations back and forth from RDF to the native DML or DDL supported by each cluster gateway 230, 240, 250. The mediator gateway 220 can scale from a single server to a farm of load-balanced servers, depending on user demand.

There is a single RDF-based DDL for all different databases 230, 240, 250 in the data lake 200. This DDL is used for defining data models and constraints. It is expressed as a set of triples based on supporting ontologies, which provide a base vocabulary to define scalar and composite types, relationships, and constraints. These triples are automatically translated by the mediator into the specific DDLs of the encapsulated databases.

Each cluster gateway 230, 240, 250 can also be implemented using a RESTful API, supporting DDL and DML that are natively supported by its subordinated database instances. The cluster gateway 230, 240, 250 is responsible for delegating requests received from the mediator gateway 220 to one or more database instances 230-i, 240-i, 250-i. Afterwards, the appropriate cluster gateway 230, 240, 250 coalesces responses from database instances 230-i, 240-i, 250-i into a single response to the mediator gateway 220. It is the responsibility of the cluster gateways 230, 240, 250 to manage the scalability, availability, redundancy, load balancing and dialect conversion issues across its subordinate database instances 230-i, 240-i, 250-i.

Since the mediator gateway 220 replicates the data to each of the cluster types 230, 240, 250 and ensures consistency, any supported query language can be used to retrieve data that was ingested into the data lake 200. Thus, the exemplary mediator gateway 220 multiplexes the different query languages supported by the underlying database clusters 230, 240, 250 in order to use the specialized query languages of the encapsulated databases for general queries. The exemplary mediator gateway 220 delegates queries to the appropriate database cluster 230, 240, 250.

In one or more embodiments, queries 210 are passed unchanged to the encapsulated databases 230, 240, 250. Read-only queries are expressed in the native language of any of the database instances 230-i, 240-i, 250-i. The mediator gateway 220 performs no translation action for queries, since it suffices to delegate the query 210 to the appropriate cluster gateway 230, 240, 250. However, the mediator gateway 220 can be used for controlling access, profiling, and billing queries.

Since the mediator gateway 220 does not apply translation to the supported query languages, if for any reason (e.g., failures or scheduled maintenance) the mediator gateway 220 is unavailable, client applications can forward queries directly to the corresponding cluster gateway 230, 240, 250 that supports such query 210. In this scenario, when the mediator gateway 220 is unavailable (all servers in the farm), all cluster gateways 230, 240, 250 will block insert-delete-update operations to enforce data consistency in the data lake 200.

In one or more embodiments, every dataset is replicated over all database engines, rather than using operators to define the destination of specific datasets. In addition, RDF is employed as a unifying language for DDL and DML, rather than using operators to move datasets across database engines.

Among other benefits, the data replication allows for the automatic detection of dark data in the data lake. Any subset of ingested data that was not queried (by any of the supported query languages) for a configurable and/or predefined period of time should be considered dark data.

Figure 3:
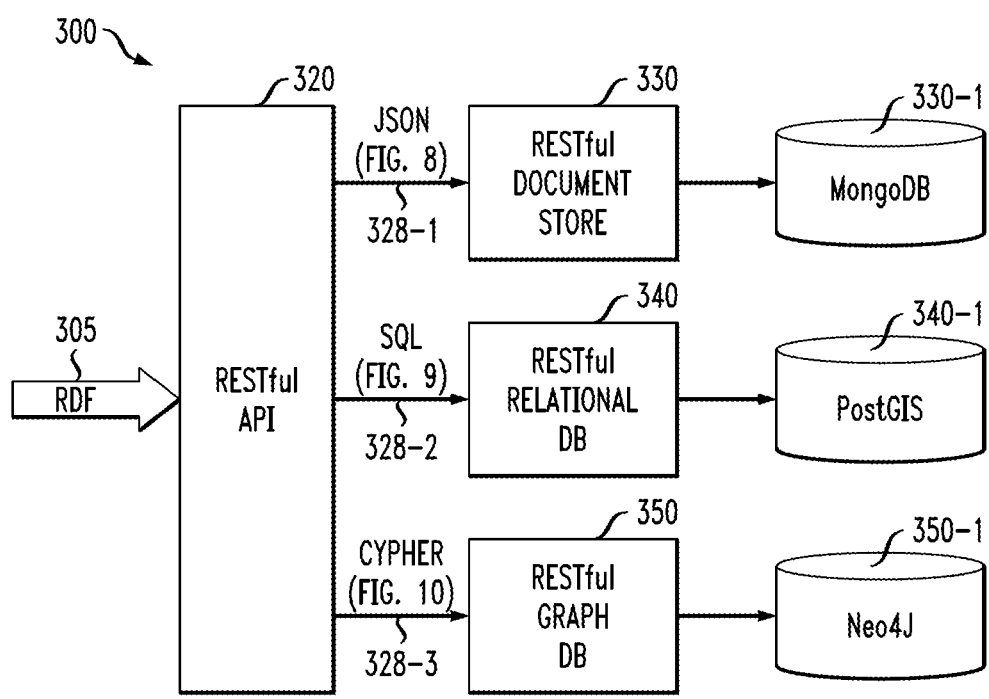
FIG. 3 illustrates an exemplary implementation of the semantic multi-database data lake architecture of FIG. 2, in accordance with one or more embodiments of the invention.

FIG. 3 illustrates an exemplary implementation 300 of the semantic multi-database data lake architecture 200 of FIG. 2, in accordance with one or more embodiments of the invention. As shown in FIG. 3, the exemplary semantic multi-database data lake 300 comprises a single mediator gateway 320 and three cluster gateways 330, 340, 350 (e.g., key-value, relational, and graph models), each of them with a singleton database instance 330-1, 340-1, 350-1, in a similar manner to FIG. 1.

In the embodiment of FIG. 3, the exemplary cluster gateways comprise a RESTful document store gateway 330 for storing key-value data in a key-value database 330-1; a RESTful relational store gateway 340 for storing relational data in a relational database 340-1; and a RESTful graph store gateway 350 for storing graph data in a graph database 350-1.

The semantic RDF-based commands (e.g., DDL and DML commands) 305 obtained from a user (e.g., for insertion, update and removal of data) are automatically translated by a mediator gateway 320 implemented as a RESTful API 320 into the specific DDL and/or DML commands 328-1 through 328-3 supported by each of the different database clusters 330, 340, 350, as discussed further below in conjunction with FIGS. 8-10, in order to replicate data obtained from the user to each of the different database types.

In the embodiment of FIG. 3, the semantic RDF-based commands 305 are automatically translated by a mediator gateway 320 into the JSON (JavaScript Object Notation) lightweight data-interchange format 328-1, as discussed further below in conjunction with FIG. 8, supported by the RESTful document store cluster 330, for storage in a MongoDB document-oriented database 330-1, from MongoDB, Inc. In addition, the semantic RDF-based commands 305 are automatically translated by the mediator gateway 320 into a SQL (Structured Query Language) format 328-2, as discussed further below in conjunction with FIG. 9, supported by the RESTful relational store cluster 340, for storage in a PostGIS object-relational database 340-1, from the PostGIS Project Steering Committee. The semantic RDF-based commands 305 are also automatically translated by the mediator gateway 320 into a Cypher Query Language format 328-3 (e.g., "CREATE" clauses), as discussed further below in conjunction with FIG. 10, supported by the RESTful graph store cluster 350, for storage in a Neo4J graph database 350-1, from Neo Technology, Inc.

Consider an exemplary telecommunication company with the core need to store all phone call records for billing purposes, as well as compliance reasons. Call Detail Records (CDR), for example, identify the calling and called parties, the call duration (e.g., start time and end time), and whereabouts (e.g., the antennas involved).

Given such type of data, some use cases that are valuable to a business comprise, for example, (i) low-latency retrieval of all phone records given the calling party; (ii) identification of call traffic given an antenna and a time span; and (iii) identification of one's closest call network starting from a given calling party. Therefore, three alternate database paradigms could elicit CDR data's potential: a NoSQL document-store, a geo-referenced relational database, and a NoSQL graph database.

The exemplary two-tier API is a design choice for maintaining the architecture robust to potential failures. If the first tier fails, all encapsulated cluster gateways 230, 240, 250 remain available for queries. From the first tier onwards, data insert-delete-update operations are redirected and replicated to all available clusters, through their respective RESTful APIs.

Semantic Schema Creation

In one or more embodiments, a single complete semantic description is provided to the mediator component 220. In this context, the RDF in the example that follows is a semantic superset that allows for the manipulation of CDR data in all specific databases 230, 240, 250 encapsulated in the data lake 200. The example refers to external ontologies including publicly available ones, such as schema.org. Not all metadata is presented, for ease of illustration. For example, many HTTP headers were omitted.

Figure 4:
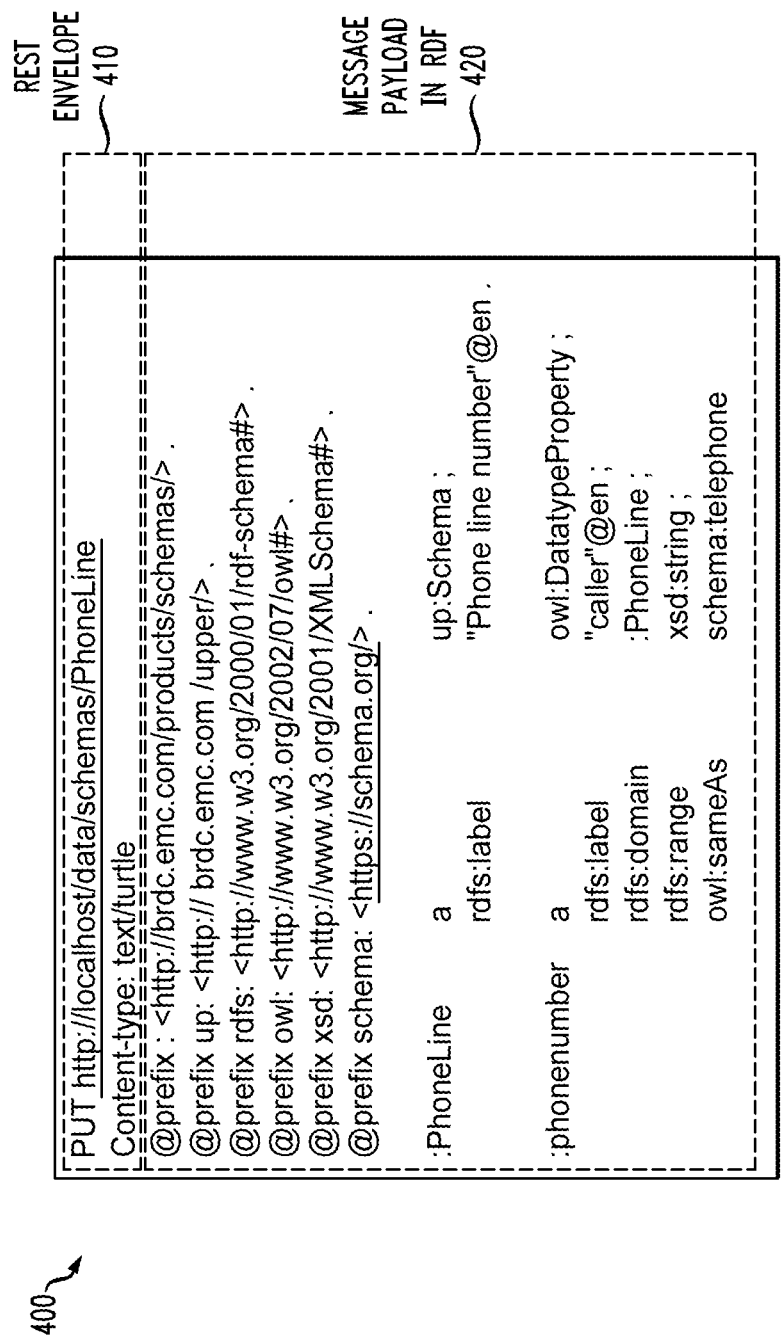
FIGS. 4 through 6 illustrate exemplary schema definitions for a number of exemplary concepts using the Resource Description Framework (RDF), according to one embodiment of the invention.
Figure 5:
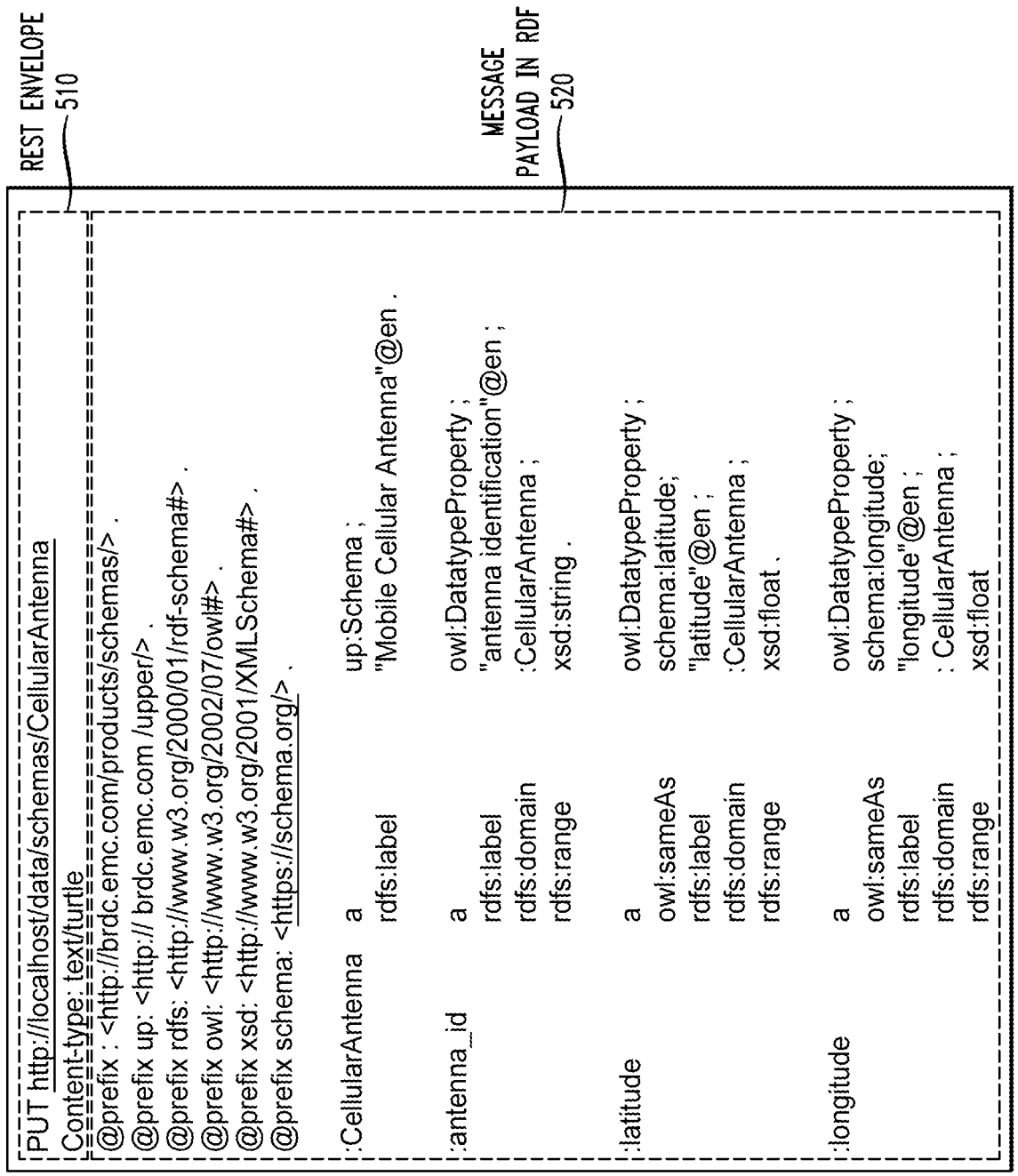
Figure 6:
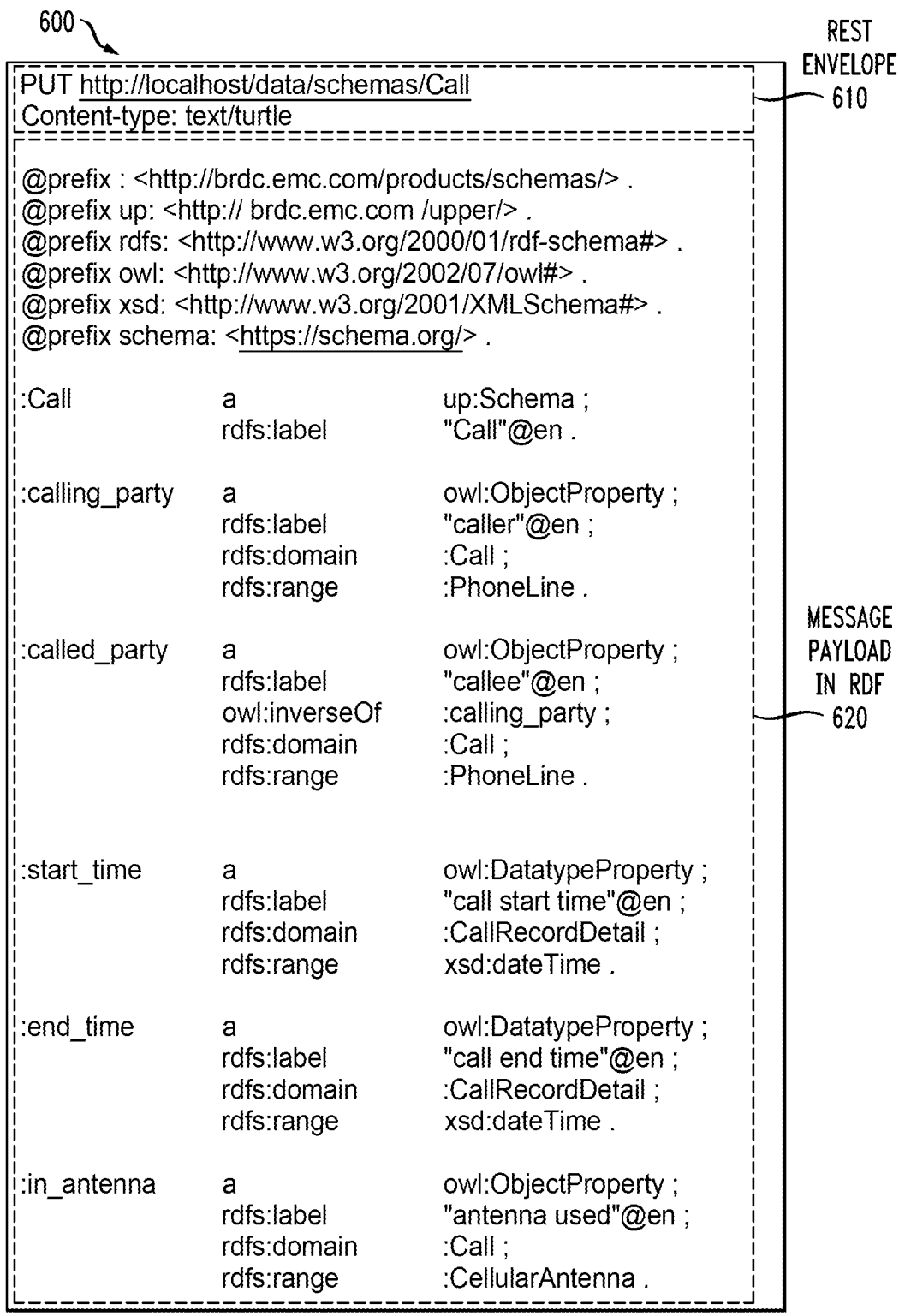

In compliance with the exemplary RESTful architecture, each schema is a resource and, as such, it is directed to a unique HTTP endpoint. In FIGS. 4-6, the HTTP verb PUT and Turtle notation are used to define the schema of three exemplary resources: PhoneLine, CellularAntenna and Call. These snippets in FIGS. 4-6 are exemplary schema definitions (RDF triples) that will be translated into the specific schemas of the databases 230, 240, 250 encapsulated in the data lake 200. All examples in this section use an exemplary Turtle notation. This is the DDL in action.

FIG. 4 illustrates an exemplary schema definition 400 (RDF triples) for a PhoneLine concept in RDF, according to one embodiment of the invention. As shown in FIG. 4, the exemplary schema definition 400 comprises a REST envelope 410 and a message payload 420 in RDF. The PUT command in the REST envelope 410 is an operation to place content at a specified location in the databases. The exemplary schema definition 400 defines a new data type (PhoneLine) for all clusters 230, 240, 250. In other words, the exemplary schema definition 400 allows users to insert data for a given "Phone line number" in databases of all clusters 230, 240, 250.

FIG. 5 illustrates an exemplary schema definition 500 (RDF triples) for a CellularAntenna concept in RDF, according to one embodiment of the invention. As shown in FIG. 5, the exemplary schema definition 500 comprises a REST envelope 510 and a message payload 520 in RDF. The PUT command in the REST envelope 510 is an operation to place content at a specified location in the databases. The exemplary schema definition 500 defines a new data type (CellularAntenna) for all clusters 230, 240, 250. In other words, the exemplary schema definition 500 allows users to insert data for a given "Mobile Cellular Antenna" in databases of all clusters 230, 240, 250.

FIG. 6 illustrates an exemplary schema definition 600 (RDF triples) for a Call concept in RDF, according to one embodiment of the invention. As shown in FIG. 6, the exemplary schema definition 600 comprises a REST envelope 610 and a message payload 620 in RDF. The PUT command in the REST envelope 610 is an operation to place content at a specified location in the databases. The exemplary schema definition 600 defines a new data type (Call) for all clusters 230, 240, 250. In other words, the exemplary schema definition 600 allows users to insert data for a given "Call" in databases of all clusters 230, 240, 250.

Semantic Instance Creation

Figure 7:
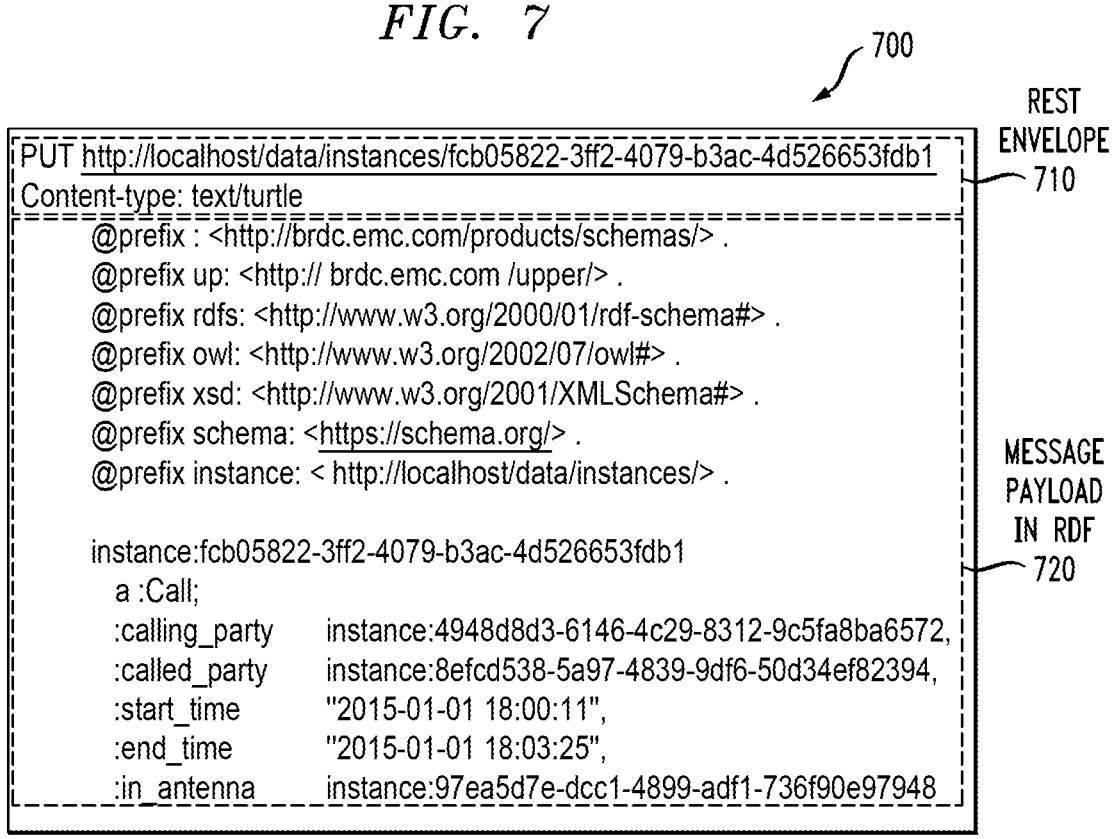
FIG. 7 illustrates an exemplary call record using the exemplary concepts defined in conjunction with FIGS. 4-6.

FIG. 7 illustrates an exemplary call record 700 in RDF using the exemplary concepts defined in conjunction with FIGS. 4-6. As shown in FIG. 7, the exemplary call record 700 comprises a REST envelope 710 and a message payload 720 in RDF. The exemplary call record 700 allows the insertion of a particular Call instance in all databases 230, 240 250. The definitions of the PhoneLine and CellularAntenna referred instances (:calling_party, :called_party, and :in_antenna) are omitted, for ease of illustration.

FIG. 7 assumes that calling_party, called_party and in_antenna were previously registered in the semantic multi database 200 using the exemplary schema definition 600 of FIG. 6. The example of FIG. 7 is creating a new instance of a call (namely instance:fcb05822-3ff2-4079-b3ac-4d526653fdb1) using RDF.

The exemplary mediator gateway 220 translates the exemplary call record 700 three times in the exemplary embodiment of FIG. 2 for the three exemplary database types, as discussed further below in conjunction with FIGS. 8-10.

Translated Schema and Instantiation

As discussed above, the translator 225 within the exemplary mediator component 220 is responsible, in one or more embodiments, for mapping the semantic schema (RDF) 205 to the data models 228 supported by each specific database 230, 240, 250, transparently to the user.

Figure 8:
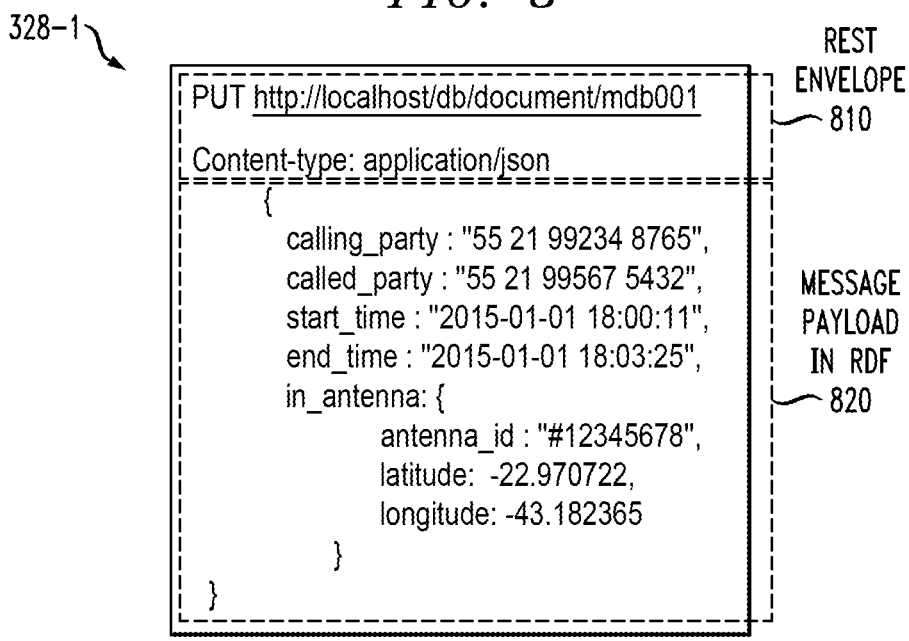
FIGS. 8 through 10 illustrate the translation of an exemplary new instantiation of the call record of FIG. 7 into a syntax suitable for different exemplary types of databases.

FIG. 8 illustrates the translation 328-1 of a new Call instantiation (FIG. 7) into a syntax suitable for a document database 330. As shown in FIG. 8, the exemplary translation 328-1 comprises a REST envelope 810 and a message payload 820 in RDF. The exemplary translation 328-1 has been translated from RDF into the language (e.g., a JSON lightweight data-interchange format 328-1) of the document database 330, such as the RESTful document store cluster 330, for storage in a MongoDB document-oriented database 330-1, from MongoDB, Inc.

Figure 9:
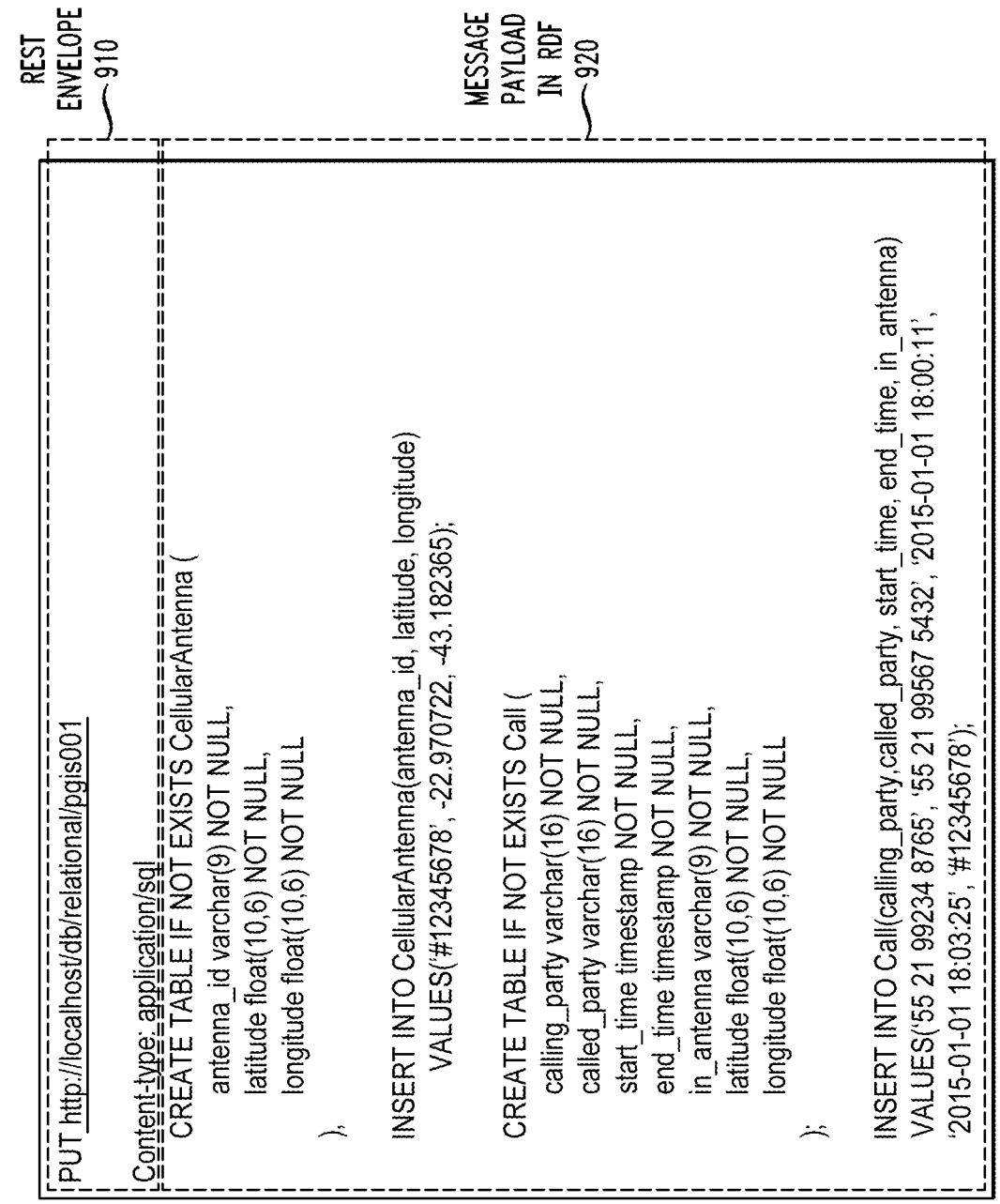

FIG. 9 illustrates the translation 328-2 of a new Call instantiation (FIG. 7) into a syntax suitable for a relation database 340. As shown in FIG. 9, the exemplary translation 328-2 comprises a REST envelope 910 and a message payload 920 in RDF. The exemplary translation 328-2 has been translated from RDF into the language (e.g., a SQL format 328-2) of the relation database 340, such as the RESTful relational store cluster 340, for storage in a Post-GIS object-relational database 340-1.

Figure 10:
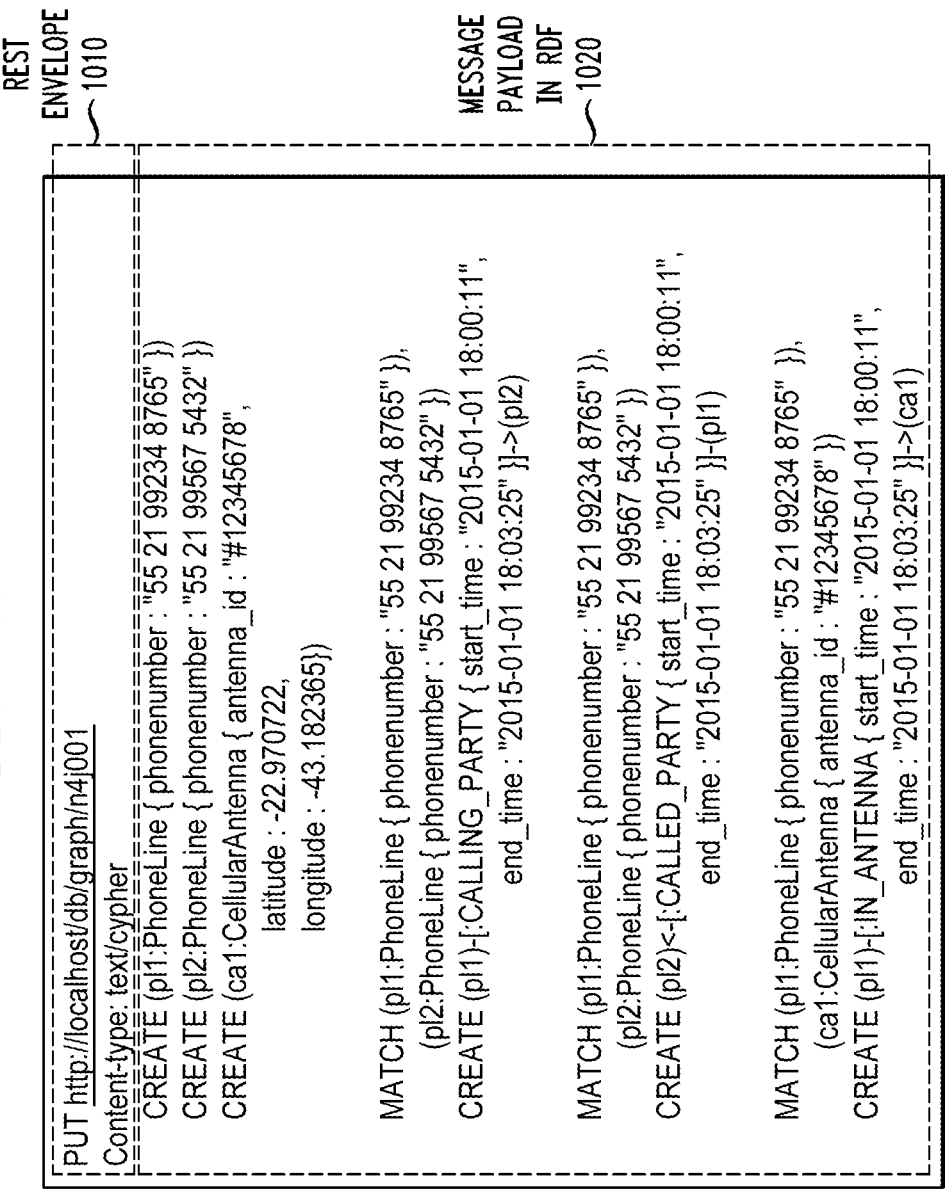

FIG. 10 illustrates the translation 328-3 of a new Call instantiation (FIG. 7) into a syntax suitable for a graph database 350. As shown in FIG. 10, the exemplary translation 328-3 comprises a REST envelope 1010 and a message payload 1020 in RDF. The exemplary translation 328-3 has been translated from RDF into the language (e.g., a Cypher Query Language format 328-3) of the graph database 350, such as the RESTful graph store cluster 350, for storage in a Neo4J graph database 350-1. For the semantic to graph translation, the following exemplary mapping strategy was adopted: each schema class in instances becomes a node; each ObjectProperty becomes an edge; and each DataProperty is seen as a property of nodes or edges.

Multi-Modal Queries

As noted above, for the exemplary CDR data described herein, there are three ways for extracting value to this particular business: (i) low-latency retrieval of all phone records given the calling party; (ii) identification of call traffic given an antenna and a time span; and (iii) identification of one's closest call network starting from a given calling party. Each database in the exemplary data lake 200 may contribute to the extraction of value from ingested data at the minimum cognitive overhead.

FIGS. 11A-11C illustrate several examples of queries, each issued for a different encapsulated database type.

FIG. 11A illustrates an exemplary query 1100 for a document database, such as a MongoDB document-oriented database 330-1. The exemplary query 1100 retrieves all call records made by calling party number "55 21 99123 9876" from the exemplary MongoDB document-oriented database 330-1.

FIG. 11B illustrates an exemplary query 1140 for a relational database, such as a PostGIS object-relational database 340-1. The exemplary query 1140 retrieves all call records registered within a radius of 10 km from latitude −22.970722 and longitude −43.182365, on the $1^{st}$ of January, 2015, from the exemplary PostGIS object-relational database 340-1.

FIG. 11C illustrates an exemplary query 1180 for a graph database, such as a Neo4J graph database 350-1. The exemplary query 1180 retrieves a social graph of call records made by calling party number "55 21 99123 9876" in a social distance of two, from the exemplary Neo4J graph database 350-1.

Conclusion

One or more embodiments of the invention provide an architecture for constructing a semantic multi-database data lake 200. A multi-database approach is used to build the data lake 200 comprised of several distinct integrated and encapsulated databases, sharing a common interface. In one or more embodiments, the disclosed architecture is characterized as follows: (i) data is stored across all encapsulated databases (ensuring consistency), which allows for multiple query languages to be used; and (ii) the Resource Description Framework (RDF) is used as an exemplary semantic notation to define the data schema as well as insert-update-delete operations. Distinct databases allow for different modes of perceiving the same data, such as: text, objects, relations or graphs. The disclosed techniques remove the complexities of ingesting and storing data in multiple distinct databases, while preserving the ability to choose an expressive and efficient language for querying data. The goal is to create a data lake 200 that gives software developers and data analysts the ability to store data of substantially any size, shape, format, or structure, and subsequently perform various types of processing and analytics over the data.

The foregoing applications and associated embodiments should be considered as illustrative only, and numerous other embodiments can be configured using the techniques disclosed herein, in a wide variety of different applications.

It should also be understood that the techniques for integrating a plurality of database types in a unified data repository, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed semantic multi-database data lake techniques may be implemented using one or more processing platforms. One or more of the processing modules or other components may therefore each run on a computer, storage device or other processing platform element. A given such element may be viewed as an example of what is more generally referred to herein as a "processing device."

Figure 12:
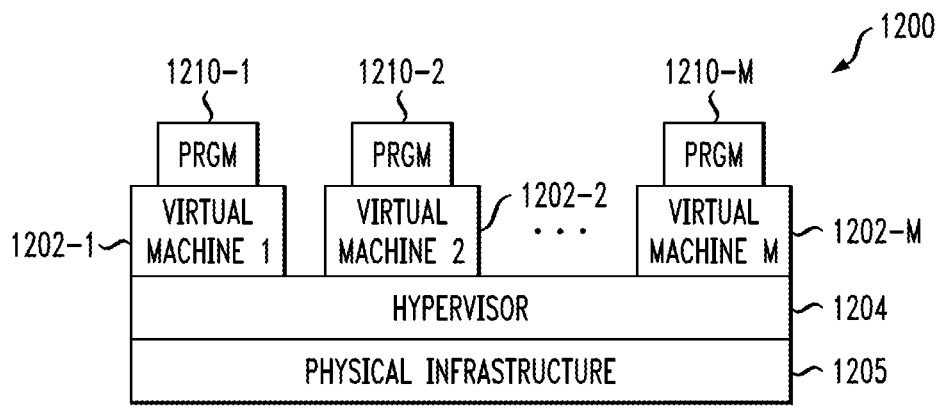
FIG. 12 illustrates an exemplary processing platform that may be used to implement at least a portion of one or more embodiments of the invention comprising a cloud infrastructure.

Referring now to FIG. 12, one possible processing platform that may be used to implement at least a portion of one or more embodiments of the invention comprises cloud infrastructure 1200. The cloud infrastructure 1200 in this exemplary processing platform comprises virtual machines (VMs) 1202-1, 1202-2, . . . 1202-M implemented using a hypervisor 1204. The hypervisor 1204 runs on physical infrastructure 1205. The cloud infrastructure 1200 further comprises sets of applications 1210-1, 1210-2, . . . 1210-M running on respective ones of the virtual machines 1202-1, 1202-2, . . . 1202-M under the control of the hypervisor 1204.

The cloud infrastructure 1200 may encompass the entire given system or only portions of that given system, such as one or more of client, servers, controller, authentication server or relying server in the system.

Although only a single hypervisor 1204 is shown in the embodiment of FIG. 12, the system may of course include multiple hypervisors each providing a set of virtual machines using at least one underlying physical machine.

An example of a commercially available hypervisor platform that may be used to implement hypervisor 1204 and possibly other portions of the system in one or more embodiments of the invention is the VMware® vSphere™ which may have an associated virtual infrastructure management system, such as the VMware® vCenter™. The underlying physical machines may comprise one or more distributed processing platforms that include storage products, such as VNX™ and Symmetrix VMAX™, both commercially available from EMC Corporation of Hopkinton, Mass. A variety of other storage products may be utilized to implement at least a portion of the system.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

Figure 13:
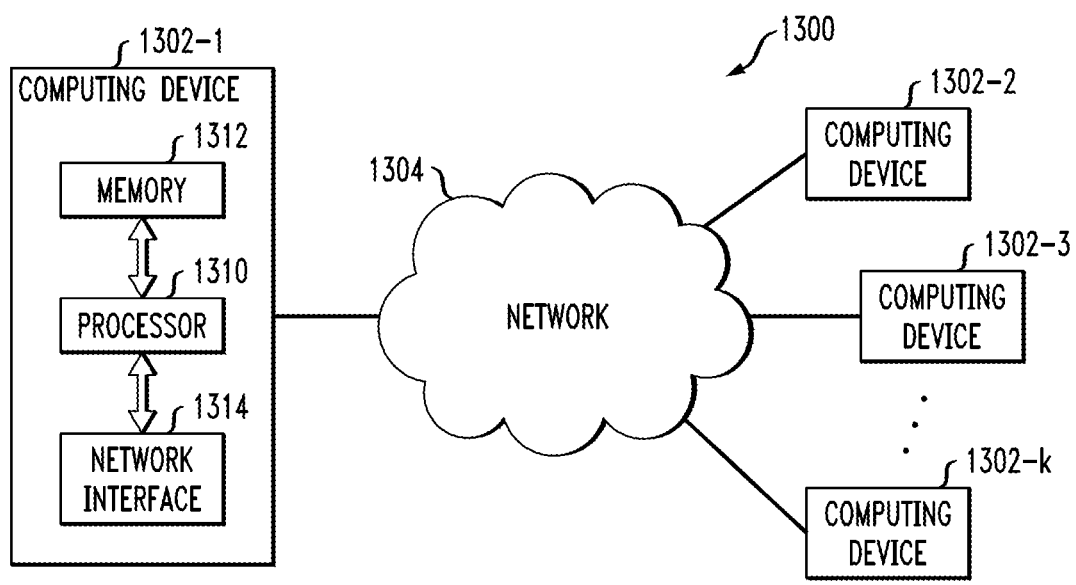
FIG. 13 illustrates another exemplary processing platform that may be used to implement at least a portion of one or more embodiments of the invention.

Another example of a processing platform is processing platform 1300 shown in FIG. 13. The processing platform 1300 in this embodiment comprises at least a portion of the given system and includes a plurality of processing devices, denoted 1302-1, 1302-2, 1302-3, . . . 1302-k, which communicate with one another over a network 1304. The network 1304 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1302-1 in the processing platform 1300 comprises a processor 1310 coupled to a memory 1312. The processor 1310 may comprise a microprocessor, a microcontroller, an application specific integrated circuit (ASIC), a field programmable gate array (FPGA) or other type of processing circuitry, as well as portions or combinations of such circuitry elements, and the memory 1312, which may be viewed as an example of a "computer program product" having executable computer program code embodied therein, may comprise random access memory (RAM), read only memory (ROM) or other types of memory, in any combination.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 12 or 13, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

Also, it should again be emphasized that the above-described embodiments of the invention are presented for purposes of illustration only. Many variations and other alternative embodiments may be used. For example, the techniques are applicable to a wide variety of other types of communication systems, storage systems and processing devices. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method, comprising the steps of:
providing a plurality of databases having different database types;
obtaining one or more user-provided ontology definition language database commands from a user;
replicating data obtained from said user for storage in one or more of said databases of each of said different database types by translating said obtained user-provided ontology definition language database commands into a plurality of database type-specific ontology definition language database commands supported by each of said different database types, wherein the plurality of database type-specific ontology definition language database commands employ one or more of: (i) a database type-specific data definition language and a (ii) database type-specific data manipulation language supported by each of said different database types, wherein said one or more database type-specific ontology definition language database commands for a first one of the databases of a first database type comprise database type-specific ontology definition language database commands supported by said first database type;
obtaining, subsequent to the translating, one or more queries from the user specified in a query language of a given database of the plurality of databases; and
delegating the one or more queries obtained from the user to the given database of the plurality of databases having different database types, without translating the query language of the one or more queries, wherein the one or more queries are delegated to the given database having a given database type that supports the query language of the one or more queries, and wherein the data responsive to the one or more queries is retrieved from the given database.

2. The method of claim 1, wherein a given database of a given database type comprises a cluster of one or more database instances of said database type.

3. The method of claim 1, wherein said ontology definition language database commands comprise Resource Description Framework (RDF)-based commands.

4. The method of claim 1, wherein said user-provided ontology definition language database commands and said database type-specific ontology definition language database commands comprise one or more of insertion, update and removal commands.

5. The method of claim 1, wherein said query language comprises one of a plurality of supported query languages.

6. The method of claim 1, further comprising the step of detecting data that was not queried by any supported query language for a predefined period of time.

7. The method of claim 1, wherein said different database types comprise two or more of a relational database, a text database, an object-oriented database, a document-oriented database, a key-value database, a knowledge base, a real-time database, an XML database, a spatial database, a time series database, a temporal database and a graph database.

8. The method of claim 2, further comprising the step of providing a plurality of cluster gateways to manage a plurality of said clusters of said one or more database instances of said database type and wherein said step of delegating the one or more queries to the given database further comprises delegating the one or more queries to the appropriate cluster gateway of the given database.

9. A computer program product, comprising a non-transitory machine-readable storage medium having encoded therein executable code of one or more software programs, wherein the one or more software programs when executed by at least one processing device perform the following steps:
providing a plurality of databases having different database types;
obtaining one or more user-provided ontology definition language database commands from a user;
replicating data obtained from said user for storage in one or more of said databases of each of said different database types by translating said obtained user-provided ontology definition language database commands into a plurality of database type-specific ontology definition language database commands supported by each of said different database types, wherein the plurality of database type-specific ontology definition language database commands employ one or more of: (i) a database type-specific data definition language and a (ii) database type-specific data manipulation language supported by each of said different database types, wherein said one or more database type-specific ontology definition language database commands for a first one of the databases of a first database type comprise database type-specific ontology definition language database commands supported by said first database type;
obtaining, subsequent to the translating, one or more queries from the user specified in a query language of a given database of the plurality of databases; and
delegating the one or more queries obtained from the user to the given database of the plurality of databases having different database types, without translating the query language of the one or more queries, wherein the one or more queries are delegated to the given database having a given database type that supports the query language of the one or more queries, and wherein the data responsive to the one or more queries is retrieved from the given database.

10. The computer program product of claim 9, wherein a given database of a given database type comprises a cluster of one or more database instances of said database type.

11. The computer program product of claim 9, wherein said user-provided ontology definition language database commands and said database type-specific ontology definition language database commands comprise one or more of insertion, update and removal commands.

12. The computer program product of claim 9, wherein said query language comprises one of a plurality of supported query languages.

13. The computer program product of claim 9, further comprising the step of detecting data that was not queried by any supported query language for a predefined period of time.

14. The computer program product of claim 10, further comprising the step of providing a plurality of cluster gateways to manage a plurality of said clusters of said one or more database instances of said database type and wherein said step of delegating the one or more queries to the given database further comprises delegating the one or more queries to the appropriate cluster gateway of the given database.

15. A system, comprising:
a memory; and
at least one processing device, coupled to the memory, operative to implement the following steps:
providing a plurality of databases having different database types;

obtaining one or more user-provided ontology definition language database commands from a user;

replicating data obtained from said user for storage in one or more of said databases of each of said different database types by translating said obtained user-provided ontology definition language database commands into a plurality of database type-specific ontology definition language database commands supported by each of said different database types, wherein the plurality of database type-specific ontology definition language database commands employ one or more of: (i) a database type-specific data definition language and a (ii) database type-specific data manipulation language supported by each of said different database types, wherein said one or more database type-specific ontology definition language database commands for a first one of the databases of a first database type comprise database type-specific ontology definition language database commands supported by said first database type;

obtaining, subsequent to the translating, one or more queries from the user specified in a query language of a given database of the plurality of databases; and delegating the one or more queries obtained from the user to the given database of the plurality of databases having different database types, without translating the query language of the one or more queries, wherein the one or more queries are delegated to the given database having a given database type that supports the query language of the one or more queries, and wherein the data responsive to the one or more queries is retrieved from the given database.

16. The system of claim 15, wherein a given database of a given database type comprises a cluster of one or more database instances of said database type.

17. The system of claim 15, wherein said user-provided ontology definition language database commands and said database type-specific ontology definition language database commands comprise one or more of insertion, update and removal commands.

18. The system of claim 15, wherein said query language comprises one of a plurality of supported query languages.

19. The system of claim 15, further comprising the step of detecting data that was not queried by any supported query language for a predefined period of time.

20. The system of claim 16, further comprising the step of providing a plurality of cluster gateways to manage a plurality of said clusters of said one or more database instances of said database type and wherein said step of delegating the one or more queries to the given database further comprises delegating the one or more queries to the appropriate cluster gateway of the given database.

* * * * *